(12) United States Patent
Sakaguchi

(10) Patent No.: US 7,079,580 B2
(45) Date of Patent: Jul. 18, 2006

(54) MOVING PICTURE ENCODER, MOVING PICTURE ENCODING METHOD, MOVING PICTURE ENCODING PROGRAM USED THEREWITH, AND STORAGE MEDIUM STORING THE SAME

(75) Inventor: Tatsumi Sakaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 10/102,496

(22) Filed: Mar. 20, 2002

(65) Prior Publication Data
US 2002/0168009 A1 Nov. 14, 2002

(30) Foreign Application Priority Data
Mar. 22, 2001 (JP) .............................. 2001-083057

(51) Int. Cl.
*H04N 7/12* (2006.01)
(52) U.S. Cl. ............ 375/240.16; 375/240; 375/240.01; 375/240.12
(58) Field of Classification Search ........... 375/240.16, 375/240.12, 240, 240.01; 382/236, 238, 382/190
See application file for complete search history.

(56) References Cited
U.S. PATENT DOCUMENTS
5,748,775 A * 5/1998 Tsuchikawa et al. ........ 382/190
5,841,470 A 11/1998 Welsh .................... 375/240.1
5,974,184 A * 10/1999 Eifrig et al. ................. 382/236
5,978,510 A * 11/1999 Chung et al. ............... 382/238
6,084,914 A 7/2000 Katata et al. ............... 375/240

FOREIGN PATENT DOCUMENTS
EP 1 061 749 12/2000
WO WO 01 50754 7/2001

OTHER PUBLICATIONS
Tzong-Der Wu et al: "Dynamic bit rate conversion in multipoint video transcoding" Image Processing, 1999. ICIP 99. Proceedings. 1999 International Conference on Kobe, Japan Oct. 24-28, 1999, Piscataway, NJ, USA,IEEE, US, Oct. 24, 1999, pp. 817-821, XPO10368743 ISBN: 0-7803-5467-2.

(Continued)

*Primary Examiner*—Allen Wong
(74) *Attorney, Agent, or Firm*—Finnegan, Henderson, Farabow, Garrett & Dunner, L.L.P.

(57) ABSTRACT

In a moving picture encoder, a motion-vector detection circuit detects each motion vector between frame pictures of moving picture data, and compression encoding units perform compression encoding on the moving picture data in units of predetermined pictures having differently arbitrary shapes by performing motion-compensation interframe prediction using the detected motion vector in common. This can greatly reduce the processing load of the entire compression encoding on a plurality of pictures obtained from a single piece of the moving picture data since the motion-vector detection circuit, on which a large processing load acts, is formed as a single unit. This structure can accelerate the compression encoding on the pictures obtained from the single piece of the moving picture data.

10 Claims, 9 Drawing Sheets

OTHER PUBLICATIONS

Pereira M et al: "Re-codable video" Proceedings of the International Conference on Image Processing (ICIP) Austin, Nov. 13-16, 1994, Los Alamitos, IEEE Comp. Soc. Press, US, vol. vol. 3 Conf. 1, Nov. 13, 1994, pp. 952-956, XP010146085 ISBN: 0-8186-6952-7.

Koenen R: "Profiles and Levels in MPEG-4 Approach and Overview" Signal Processing. Image Communication, Elsevier Science Publishers, Amsterdam, NL, vol. 15, Jan. 2000, pp. 463-478, XP000885374 ISSN: 0923-5965.

Puri A et al: "MPEG-4: An object-based multimedia coding standard supporting mobile applications" Mobile Networks and Applications, Baltzer Science Publishers, Bussum, NL, No. 3, Jun. 1998, pp. 5-32, XP002150680 ISSN: 1383-469X.

* cited by examiner

MOVING PICTURE ENCODER, MOVING PICTURE ENCODING METHOD, MOVING PICTURE ENCODING PROGRAM USED THEREWITH, AND STORAGE MEDIUM STORING THE SAME

BACKGROUND OF THE INVENTION

1. Field of the Invention

The present invention relates to a moving picture encoder, a moving picture encoding method, a moving picture encoding program used therewith, and a storage medium storing the program. For example, the present invention is preferably applied to a moving picture encoder that uses the Internet to distribute moving picture data in compressed and encoded form.

2. Description of the Related Art

Recently, the distribution by the Internet of moving picture data, so-called "streaming" has come into widespread use. In streaming, by using the Internet to transmit to a user's personal computer moving picture data obtained by using a videocamera or the like to capture the picture of a subject, a moving picture based on the moving picture data is shown in real time.

In the actual distribution of moving picture data by streaming, the transfer rate at which the moving picture data can be transmitted by the Internet is relatively low. Accordingly, the moving picture data is distributed in reduced-capacity form by providing at the transmitting side a moving picture encoder employing, for example, the MPEG-2 compression encoding standard of the International Organization for Standardization/International Electrotechnical Commission (ISO/IEC), using the moving picture encoder to sequentially reduce the moving picture data in units of frame pictures by performing pixel decimation, and subsequently performing compression encoding at a relatively high compression factor.

In the above distribution of moving picture data by streaming, the resolution (level representing picture roughness) and picture quality (indicating whether noise exists) of a moving picture provided to a user deteriorate because the moving picture encoder at the transmitting side uses a relatively high compression factor to perform compression encoding. To eliminate this deterioration, enhancement of the resolution and picture quality of moving pictures for distribution is in great demand.

Accordingly, for the distribution of the moving picture data by streaming, it has been proposed that the MPEG-4 compression encoding method standard be applied to the moving picture encoder.

In MPEG-4, processing (hereinafter referred to as "simple profile processing") for compressing and encoding moving picture data similar to that in the MPEG-2 standard can be executed by performing sequential motion-compensation interframe prediction in units of frame pictures, and processing (hereinafter referred to as "core profile processing") is executed which tracks and extracts an arbitrary-shaped picture (hereinafter referred to as an "extracted picture") from frame-picture-unit picture data (hereinafter referred to as "frame-picture data") composed of consecutive picture data, and which compresses and encodes the data (hereinafter referred to as the "extracted-picture data") of the extracted picture by performing sequential motion-compensation interframe prediction.

Accordingly, in the distribution of moving picture data by streaming, compression encoding at a relatively low compression factor is performed because, after moving picture data obtained by using a videocamera or the like to capture the picture of a subject is input to two moving picture encoders in accordance with the MPEG-4 standard, one moving picture encoder is controlled to execute simple profile processing so that the moving picture data is compression-encoded at a relatively high compression factor, and the other moving picture encoder is controlled to execute core profile processing so that the moving picture data is compression-encoded at a relatively low compression factor since the amount of extracted picture data obtained by performing sequential tracking and extraction from the frame-picture data of the moving picture data is less than that of the frame-picture data.

In addition, in the above moving picture distribution, it is possible that, by transmitting to the user's personal computer the frame-picture data and extracted-picture data compressed and encoded by the moving picture encoder, and by using the personal computer to display an extracted picture based on the extracted-picture data so as to be superimposed on a frame picture based on frame-picture data, a moving picture in which only the extracted picture is processed to have a high resolution and a high picture quality can be shown to the user.

In the above moving picture distribution by streaming, if a single moving picture encoder executes both simple profile processing and core profile processing, the transmitting side can be simplified in structure.

According to the above moving picture distribution, in a single moving picture encoder, a motion-vector detection circuit and a compression encoding circuit which sequentially compress and encode moving picture data in units of frame pictures by using simple profile processing, and another motion-vector detection circuit and another compression encoding circuit must be separately provided which sequentially track and extract picture data from frame-picture data composed of consecutive moving picture data by using core profile processing must be provided. Since the two provided motion-vector detection circuits have an extremely large processing load, the total processing load of the entire compression encoding greatly increases, so that the compression encoding requires a lot of processing time.

SUMMARY OF THE INVENTION

It is an object of the present invention to provide a moving picture encoder and a moving picture encoding method which perform high-speed compression-encoding processing on a plurality of pictures obtained from moving picture data, a moving picture encoding program used with the encoder and the method, and a storage medium storing the program.

To this end, according to an aspect of the present invention, a moving picture encoder is provided. The moving picture encoder includes a motion-vector detection unit which detects each motion vector between frame pictures of moving picture data, and a plurality of compression encoding units which perform compression encoding on the moving picture data in units of predetermined pictures having different arbitrary shapes by performing motion-compensation interframe prediction using the detected motion vector in common.

Preferably, the moving picture encoder further includes a tracking unit which sequentially tracks a predetermined tracking region in each of the frame pictures consecutively having the moving picture data by using the detected motion vector in common, and an extraction unit which extracts an arbitrary-shaped picture from the tracked predetermined tracking region in each of the frame pictures. Among the plurality of compression encoding units, an arbitrary compression encoding unit performs compression encoding on the moving picture data in units of the frame pictures as the units of predetermined pictures having different arbitrary shapes, and one of the plurality of compression encoding units which is different from the arbitrary compression encoding unit performs compression encoding on the moving picture data in units of each arbitrary-shaped picture as the units of predetermined pictures having different arbitrary shapes.

The moving picture encoder may further include a scene-change detection unit which detects correlation between the frame pictures and determines, based on the detected correlation, whether or not a scene in moving picture has changed. The tracking unit stops the tracking of the tracking region for frame pictures following after the frame picture at the time the scene-change detection unit has determined that the scene has changed.

According to another aspect of the present invention, a moving picture encoding method is provided. The moving picture encoding method includes a motion-vector detection step for detecting each motion vector between frame pictures of moving picture data, and a compression encoding step for performing compression encoding on the moving picture data in units of predetermined pictures having different arbitrary shapes by performing motion-compensation interframe prediction using the detected motion vector in common.

Preferably, the moving picture encoding method further includes a tracking step for sequentially tracking a predetermined tracking region in each of the frame pictures consecutively having the moving picture data by using the detected motion vector in common, and an extraction step for extracting an arbitrary-shaped picture from the tracked predetermined tracking region in each of the frame pictures. In the compression encoding step, the compression encoding on the moving picture data is performed in units of the frame pictures as the units of predetermined pictures having different arbitrary shapes, and the compression encoding on the moving picture data is performed in units of each arbitrary-shaped picture as the units of predetermined pictures having different arbitrary shapes.

The moving picture encoding method may further include a scene-change detection step for detecting correlation between the frame pictures and determines, based on the detected correlation, whether or not a scene in moving picture has changed. In the tracking step, the tracking of the tracking region is stopped for frame pictures following after the frame picture at the time the scene-change detection unit has determined that the scene has changed.

According to another aspect of the present invention, a storage medium storing a moving picture encoding program for controlling a moving picture encoder to execute a process is provided. The process includes a motion-vector detection step for detecting each motion vector between frame pictures of moving picture data, and a compression encoding step for performing compression encoding on the moving picture data in units of predetermined pictures having different arbitrary shapes by performing motion-compensation interframe prediction using the detected motion vector in common.

According to another aspect of the present invention, a moving picture encoding program for controlling a moving picture encoder to execute a process is provided. The process includes a motion-vector detection step for detecting each motion vector between frame pictures of moving picture data, and a compression encoding step for performing compression encoding on the moving picture data in units of predetermined pictures having different arbitrary shapes by performing motion-compensation interframe prediction using the detected motion vector in common.

According to the present invention, the load of the entire compression-encoding processing on a plurality of pictures obtained from moving picture data can be greatly reduced. This can accelerate the compression-encoding processing on the pictures obtained from the moving picture data.

DESCRIPTION OF THE PREFERRED EMBODIMENTS

An embodiment of the present invention is described below with reference to the accompanying drawings.

Figure 1:
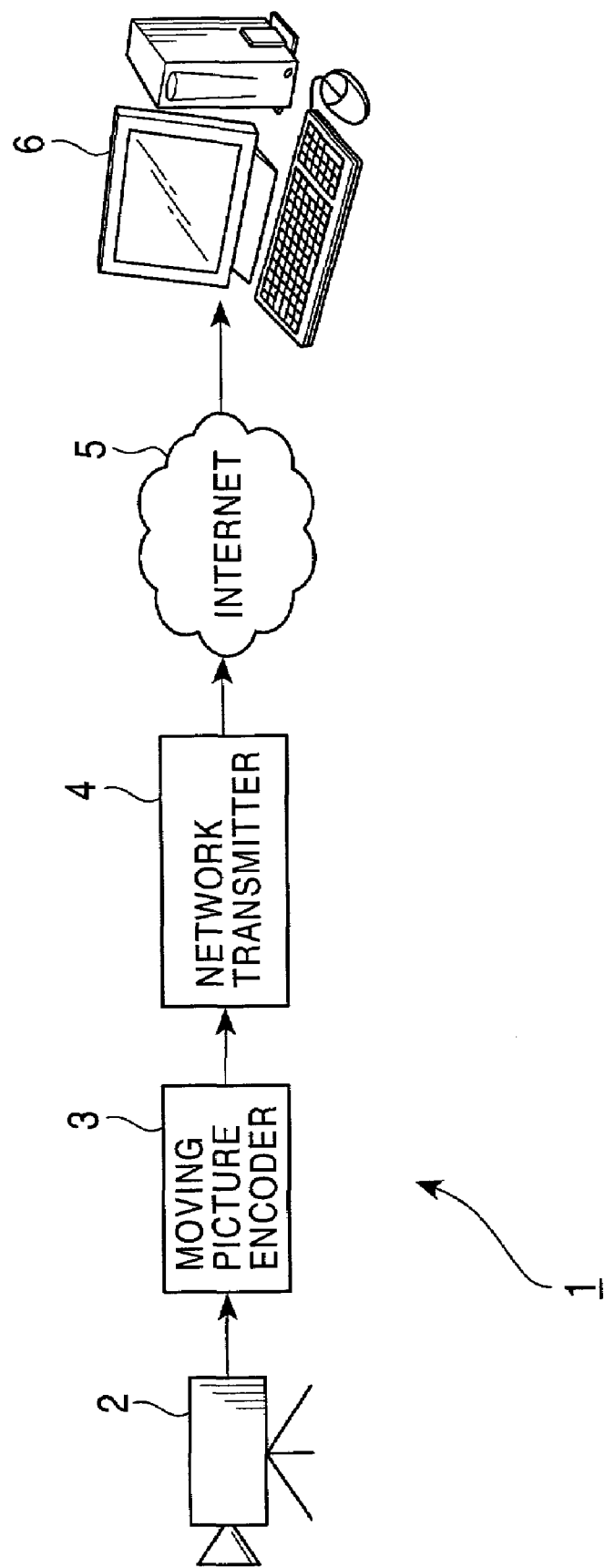
FIG. 1 is a block diagram showing a form of distributing moving picture data in a moving-picture-data distribution system.

1. Moving-Picture-Data Distribution Form in Moving-Picture-Data Distribution System As FIG. 1 shows, in a moving-picture-data distribution system 1, moving picture data obtained by using a video-camera 2 at the transmitting side to capture the picture of a subject is input to a moving picture encoder 3 which uses the MPEG-4 standard.

Figure 2A:
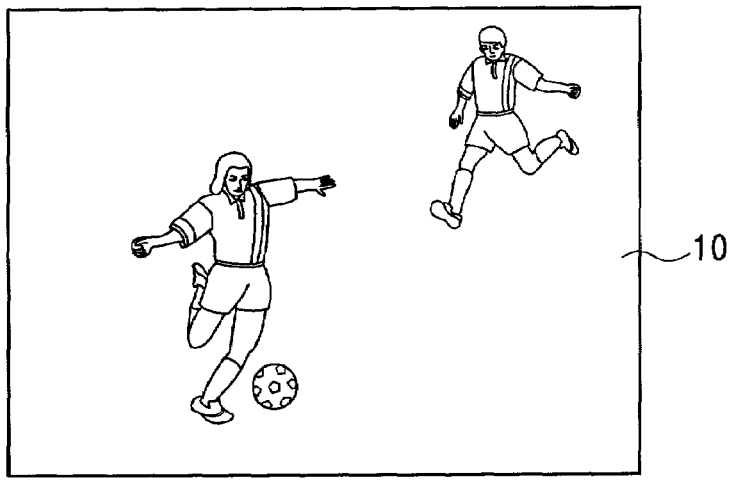
FIGS. 2A, 2B, and 2C are illustrations of processing of moving picture data in the moving-picture-data distribution system shown in FIG. 1.
Figure 2B:
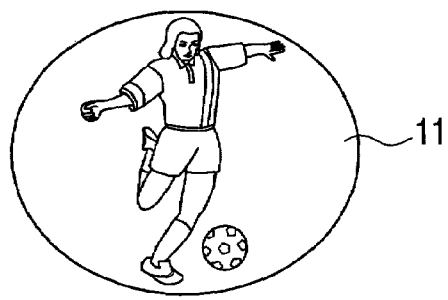

As FIG. 2A shows, the moving picture encoder 3 performs sequential compression encoding on the moving picture data at a relatively high compression factor in units of each frame picture 10 by performing simple profile processing, and sends the compression-encoded frame-picture data to a network transmitter 4. As FIG. 2B shows, the moving picture encoder 3 also sequentially tracks and extracts the data of an arbitrary-shaped picture (extracted picture) 11 from the picture data (frame-picture data) of units of each frame picture 10 and performs compression encoding on the extracted data at a relatively low compression rate by performing core profile processing, and sends the compression-encoded extracted-picture data to the network transmitter 4.

After performing time-divisional multiplexing of the compression-encoded frame-picture data and the compression-encoded extracted-picture data which are sequentially sent from the moving picture encoder 3, the network transmitter 4 transmits the obtained data stream to a personal computer 6 at the receiving side via the Internet 5.

Figure 2C:
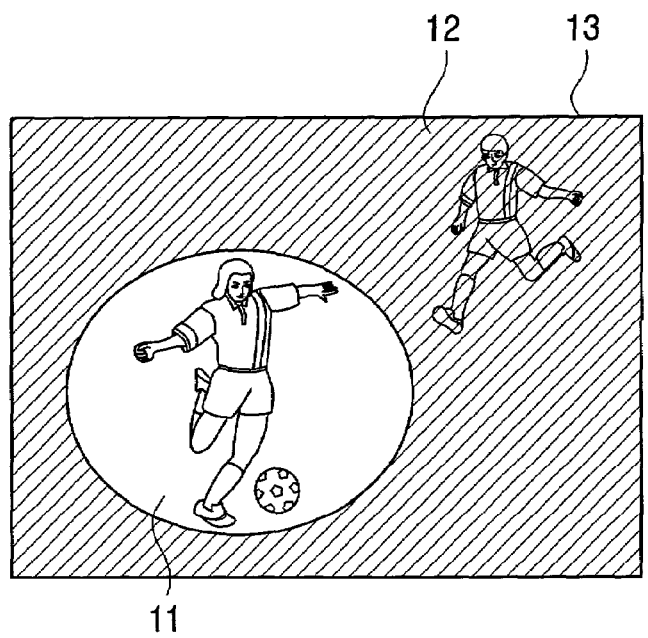

When receiving the data stream transmitted from the network transmitter 4 via the Internet 5, the personal computer 6 separates the data stream into compression-encoded frame-picture data and compression-encoded extracted-picture data. By sequentially decoding the compression-encoded frame-picture data and the compression-encoded extracted-picture data, and sending the decoded data to a display unit, the personal computer 6 displays a screen in which the extracted picture 11, which is based on the extracted-picture data and which has a high resolution and a high picture quality, is superimposed on a frame picture 12 which is based on the frame-picture data and which has a low resolution and a low picture quality, as shown in FIG. 2C.

Accordingly, the moving-picture-data distribution system 1 is designed so that, by distributing the moving picture data, as described above, a moving picture that is generated by processing only the arbitrary-shaped extracted picture 11 in order that it has a high resolution and a high picture quality can be displayed to the user.

2. Embodiment

2-1. Structure of Moving Picture Encoder

Figure 3:
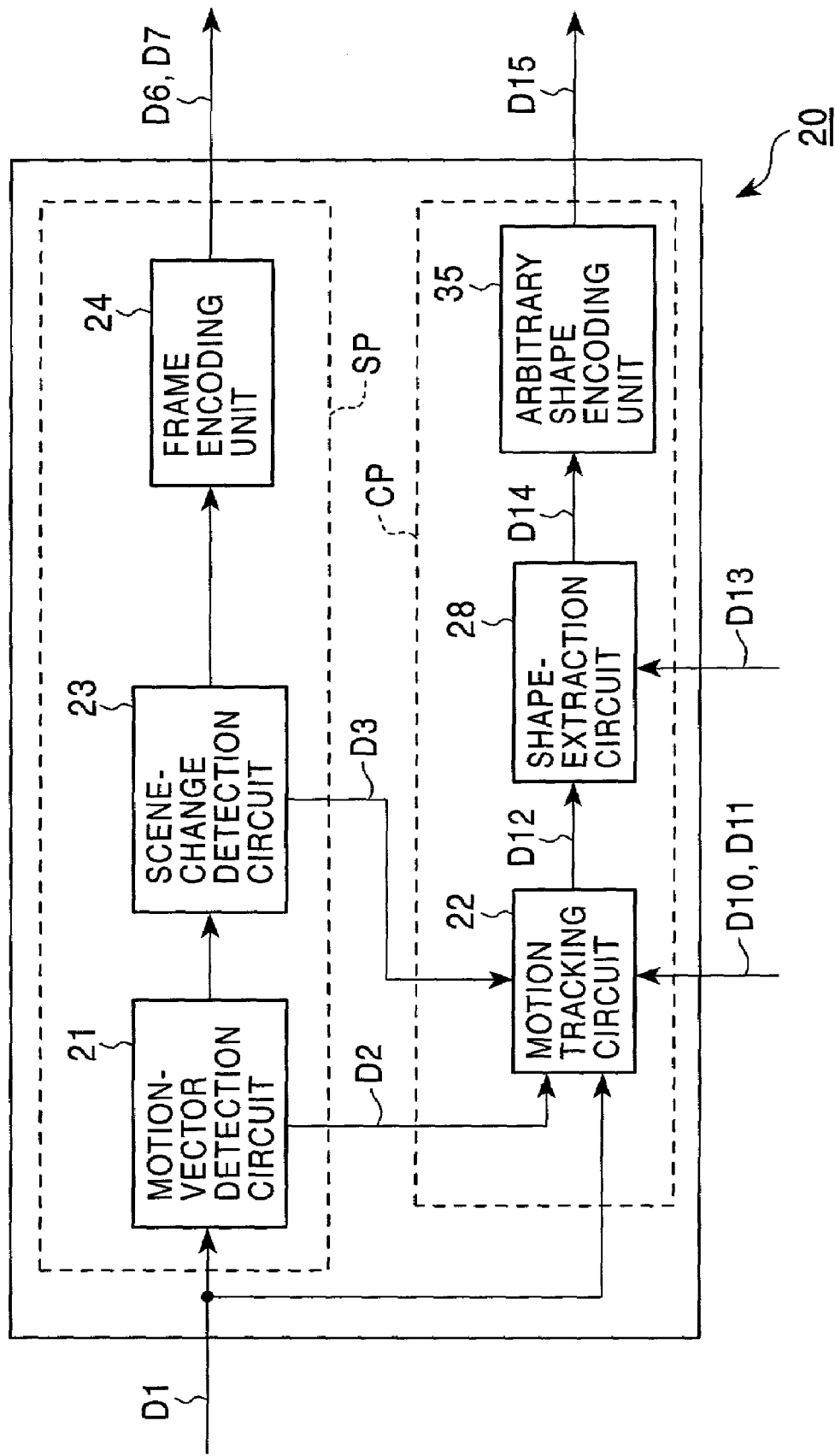
FIG. 3 is a block diagram showing a moving picture encoder according to an embodiment of the present invention.

FIG. 3 shows the entirety of a moving picture encoder 20 of the present invention. In this moving picture encoder 20, moving picture data D1 which is supplied from an external videocamera (not shown) for capturing the picture of a subject (not shown) is sequentially input in units of frame pictures both to a motion-vector detection circuit 21 included in a path SP (hereinafter referred to as a "simple-profile-processing path SP") that executes simple profile processing, and to a motion tracking circuit 22 included in a path CP (hereinafter referred to as a "core-profile-processing path CP") that executes core profile processing simultaneously with and in parallel with the simple profile processing.

In the motion-vector detection circuit 21, from the intra-coded picture (I-picture) type for performing compression encoding by sequential intra-frame encoding and the predicted picture (P-picture) type for performing compression encoding by forward motion-compensation interframe prediction, one compression encoding type is assigned in predetermined order to frame-picture data constituting the externally input moving picture data D1.

When assigning the I-picture type to the frame-picture data, the motion-vector detection circuit 21 divides a frame picture based on the I-picture-assigned frame-picture data (hereinafter referred to as the "I-frame picture data") into a plurality of macroblocks.

The motion-vector detection circuit 21 uses block matching to detect each motion vector in each macroblock between the I-frame picture data and frame-picture data (P-frame picture data) which is temporally positioned one frame before the I-frame picture data, and sends the motion vector for each macroblock as vector data D2 to the motion tracking circuit 22, together with both information for identifying the I-frame picture data and assigned-picture information representing the assignment of the I-picture type to the I-frame picture data. The motion-vector detection circuit 21 also sends, to a scene-change detection circuit 23, the motion vector for each macroblock and I-frame picture data generated by dividing the motion vector for each macroblock in units of macroblocks.

When assigning the P-picture type to the frame-picture data, the motion-vector detection circuit 21 divides a frame picture based on the P-picture-assigned frame-picture data (hereinafter referred to as the "P-frame picture data") into a plurality of macroblocks.

The motion-vector detection circuit 21 uses block matching to detect each motion vector in each macroblock between the P-frame picture data and frame-picture data (I-frame picture data or P-frame picture data) which is temporally positioned one frame before the P-frame picture data, and sends the motion vector for each macroblock as vector data D2 to the motion tracking circuit 22, together with both information for identifying the P-frame picture data and assigned-picture information representing the assignment of the P-picture type to the P-frame picture data. The motion-vector detection circuit 21 also sends, to the scene-change detection circuit 23, the motion vector for each macroblock and P-frame picture data generated by dividing the motion vector for each macroblock in units of macroblocks.

When the motion vector for each macroblock and the I-frame picture data are sequentially supplied in units of macroblocks from the motion-vector detection circuit 21, the scene-change detection circuit 23 determines, based on the motion vector for each macroblock, whether or not the I-frame picture data is frame-picture data at the time a scene in moving picture changes.

When the scene in the moving picture changes, motion vectors in the macroblocks of the frame picture based on the I-frame picture data greatly increase (when the components of a moving-picture frame picture change to completely different ones at scene change, the motion vector for each macroblock may not be detected), or have greatly different values.

Accordingly, based on, for example, the motion vector for each macroblock of I-frame data, the motion vector for each macroblock of the P-frame picture data which is temporally positioned one frame before the I-frame data, the scene-change detection circuit 23 calculates correlation between frame pictures, and finds whether or not the correlation is less than the threshold value by comparing the calculated correlation with a predetermined threshold value. If the correlation is less than the threshold value, the scene-change detection circuit 23 determines that the scene has not changed, and generates scene-continuation information representing the result of the determination.

Conversely, if the correlation is not less than the threshold value, the scene-change detection circuit 23 determines that the scene has changed, and generates scene-change information representing the result of the determination.

After determining that the scene has not changed or has changed, as described above, the scene-change detection circuit 23 sends the scene-continuation information or the scene-change information as scene-change data D3 to the motion tracking circuit 22 with the information for identifying the I-frame picture data, and also sends the scene-continuation information or the scene-change information to a frame encoding unit 24 with I-frame picture data which is divided in units of macroblocks, and the motion vector for each macroblock.

In addition, when the P-frame picture data is supplied in units of macroblocks from the motion-vector detection circuit 21 with the motion vector for each macroblock, the scene-change detection circuit 23 similarly determines, based on correlation between the P-frame picture data and frame-picture data which is temporally positioned one frame before the P-frame picture data, whether or not the P-frame picture data is frame-picture data at the time a scene in the moving picture changes.

After determining that the scene has changed or has not changed, the scene-change detection circuit 23 sends the scene-continuation information or scene-change information, which represents the result of the determination, as scene-change data D3 to the motion tracking circuit 22 with the information for identifying the P-frame picture data, and also sends the scene-continuation information or scene-change information to the frame encoding unit 24 with the P-frame picture data which is divided into units of macroblocks, and the motion vector for each macroblock.

When being supplied with the I-frame picture data in units of macroblocks from the scene-change detection circuit 23, the frame encoding unit 24 reduces the size of a frame picture based on the I-frame picture data by performing pixel decimation for each macroblock so that block size is reduced, and performs compression encoding on the reduced I-frame picture data at a relatively high compression factor by using intra-frame encoding in units of macroblocks (hereinafter referred to as "reduced macroblocks") which are reduced in size. The scene-change detection circuit 23 sends the obtained compression-encoded frame-picture data D6 to an external network transmitter (not shown).

When being supplied with the P-frame picture data which is divided in units of macroblocks, the motion vector for each macroblock, and the scene-continuation information from the scene-change detection circuit 23, the frame encoding unit 24 reduces the size of a frame picture based on the P-frame picture data by performing pixel decimation for each macroblock so that block size is reduced, and also reduces the motion vector for each macroblock in accordance with the reduced P-frame picture data.

The frame encoding unit 24 performs compression encoding on the reduced P-frame picture data at a relatively high compression factor by performing forward motion-compensation interframe prediction using motion vectors (hereinafter referred to as "reduced motion vectors") obtained by reducing the reduced P-frame picture data in units of reduced macroblocks, and sends the obtained compression-encoded frame-picture data D7 to the external network transmitter.

When the P-frame picture data which is divided in units of macroblocks, the moving vector for each macroblock, and the scene-change information are supplied from the scene-change detection circuit 23, the frame encoding unit 24 changes the P-frame picture data to the I-frame picture data by changing the compression encoding type assigned to the P-frame picture data to the I-picture type.

When changing the P-frame picture data to the I-frame picture data, the frame encoding unit 24 generates reduced I-frame picture data from the I-frame picture data, and also performs compression encoding on the reduced I-frame picture data at a relatively high compression factor in units of reduced macroblocks. The frame encoding unit 24 sends the obtained compression-encoded frame-picture data D6 to the external network transmitter.

After moving picture data D1 is sequentially compression-encoded in units of frames, even when it is difficult to use the forward motion-compensation interframe prediction to perform appropriate compression encoding on the P-frame picture data to be compression-encoded since a scene in moving picture has changed and the motion vectors of macroblocks greatly increase or have greatly different values, the frame encoding unit 24 can perform appropriate compression encoding on the P-frame picture corresponding to the scene change by changing the P-frame picture data at the time to I-frame picture data.

The frame encoding unit 24 detects a series of the I-frame picture data and the P-frame picture data which are supplied from the scene-change detection circuit 23. For example, in a case in which the frame encoding unit 24 changes P-frame picture data which is just before I-frame picture data to I-frame picture data in accordance with the scene-change information, when original I-frame picture data which follows the P-frame picture data and the scene-continuation information are supplied from the scene-change detection circuit 23, the frame encoding unit 24 changes the compression encoding type assigned to the original I-frame picture data to the P-picture type, and subsequently performs compression encoding on the P-frame picture data by using forward motion-compensation prediction, as described above.

Accordingly, if the frame encoding unit 24 has changed the P-frame picture data to the I-frame picture data in response to the scene change in moving picture, I-frame picture data continues as frame-picture data to be encoded, whereby the amount of the encoded data can be prevented from increasing compared with the entirety of the moving picture data.

Figure 4:
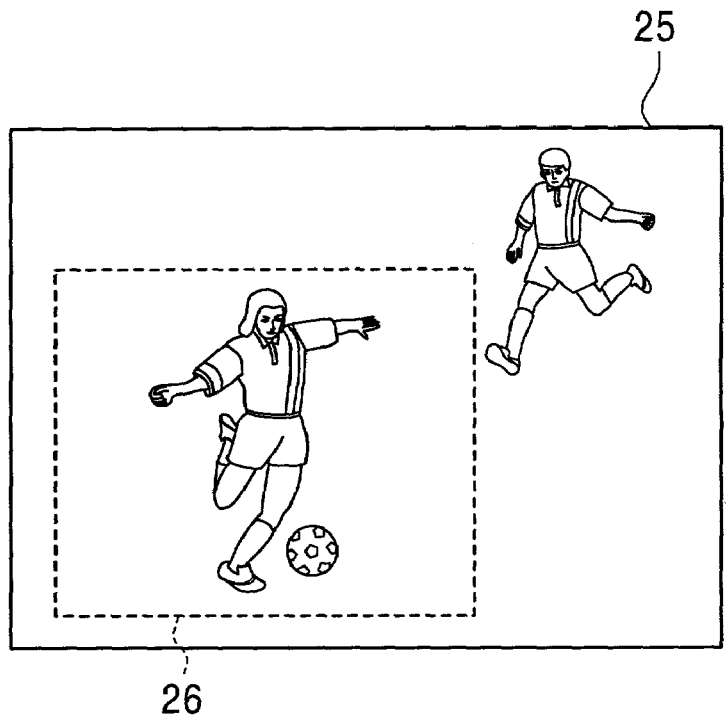
FIG. 4 is an illustration of designation of a tracking region.

Tracking-designating data D10 which designates a predetermined rectangular region (hereinafter referred to as a "tracking region") 26 including a person, etc., to be tracked in a frame picture 25 based on frame-picture data, and tracking-stop data D11 which designates termination of tracking processing in the frame picture 25, as shown in FIG. 4, can be externally input to the motion tracking circuit 22.

When being supplied with tracking-designating data D10, the motion tracking circuit 22 divides the frame picture 25 into a plurality of macroblocks, and detects from the macroblocks the positions of all macroblocks relating to the tracking region 26 designated by tracking-designating data D10.

The motion tracking circuit 22 sends information on the detected positions of the macroblocks as tracking data D12 to a shape-extraction circuit 28, together with the identification information, the assigned-picture information, and the motion vector of each macroblock in the corresponding motion vector data D2 supplied from the motion-vector detection circuit 21, and the corresponding frame-picture data which is divided in units of macroblocks.

While the scene-change data D3 is being sequentially supplied from the scene-change detection circuit 23 to the motion tracking circuit 22 after it detects the positions of the macroblocks, whenever the motion tracking circuit 22 sequentially captures frame-picture data corresponding to the identification information in the scene-change data D3 from the exterior, it sequentially divides the frame picture 25 based on the frame-picture data into a plurality of macroblocks, and tracks and detects the position of each moved macroblock relating to the tracking region 26 in the frame picture 25 by using the corresponding motion vector D2 (i.e., the motion vector for each macroblock) supplied from the motion-vector detection circuit 21, for example, by using line matching.

The motion tracking circuit 22 sends information on the position of each moved macroblock as tracking data D12 to the shape-extraction circuit 28, together with the identification information, the assigned-picture information, the motion vector of each macroblock in the corresponding motion vector data D2, and the corresponding frame-picture data which is divided in units of macroblocks.

As described above, in a case in which the scene-change data D3 which includes the scene-change information is supplied from the scene-change detection circuit 23 to the motion tracking circuit 22 when it executes tracking the tracking region 26 of the frame picture 25, the motion tracking circuit 22 stops tracking of the frame-picture data corresponding to the identification information in the scene-change data D3. After that, until new tracking-designating data D10 is supplied, the motion tracking circuit 22 continues to be in a state of stopping the tracking on sequentially captured frame-picture data. The motion tracking circuit 22 notifies the shape-extraction circuit 28 of the state.

When a scene changes in moving picture, it is difficult for the motion tracking circuit 22 to track the tracking region 26 since the tracking region 26 greatly moves in the frame picture 25, a particular person included in the tracking region 26 enlarges, or the particular person disappears in the tracking region 26. However, the motion tracking circuit 22 can effectively avoid this type of condition.

Also in a case in which the tracking-stop data D11 is externally supplied to the motion tracking circuit 22 when it executes tracking the tracking the tracking region 26 in the frame picture 25, the motion tracking circuit 22 similarly steps the tracking and notifies the shape-extraction circuit 28 of the state.

Figure 5:
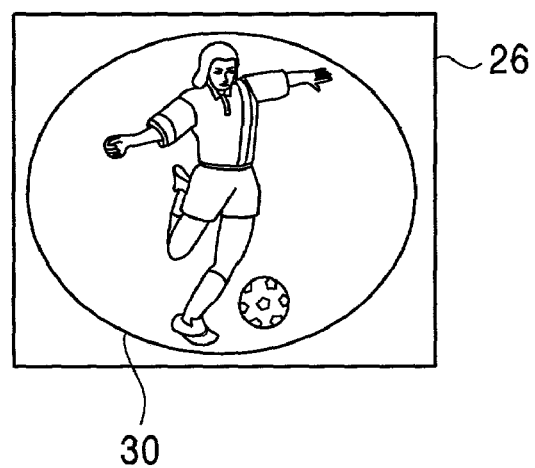
FIG. 5 is an illustration of a frame for obtaining an arbitrary-shaped extracted picture from the tracking region shown in FIG. 4.

The shape-extraction circuit 28 is designed so that, when the tracking-designating data D10 is input to the motion tracking circuit 22, shape-designation data D13 which designates a frame 30 (as shown in FIG. 5) for specifying an extracted arbitrary-shaped (e.g., elliptic) picture in the tracking region 26 can be externally input.

Accordingly, when the tracking data D12 is supplied from the motion tracking circuit 22 after the shape-extraction data D13 is externally supplied, the shape-extraction circuit 28 detects, based on the position of each macroblock which is obtained based on the tracking data D12, the tracking region 26 in the frame picture 25 based on the corresponding frame-picture data.

Figure 6:
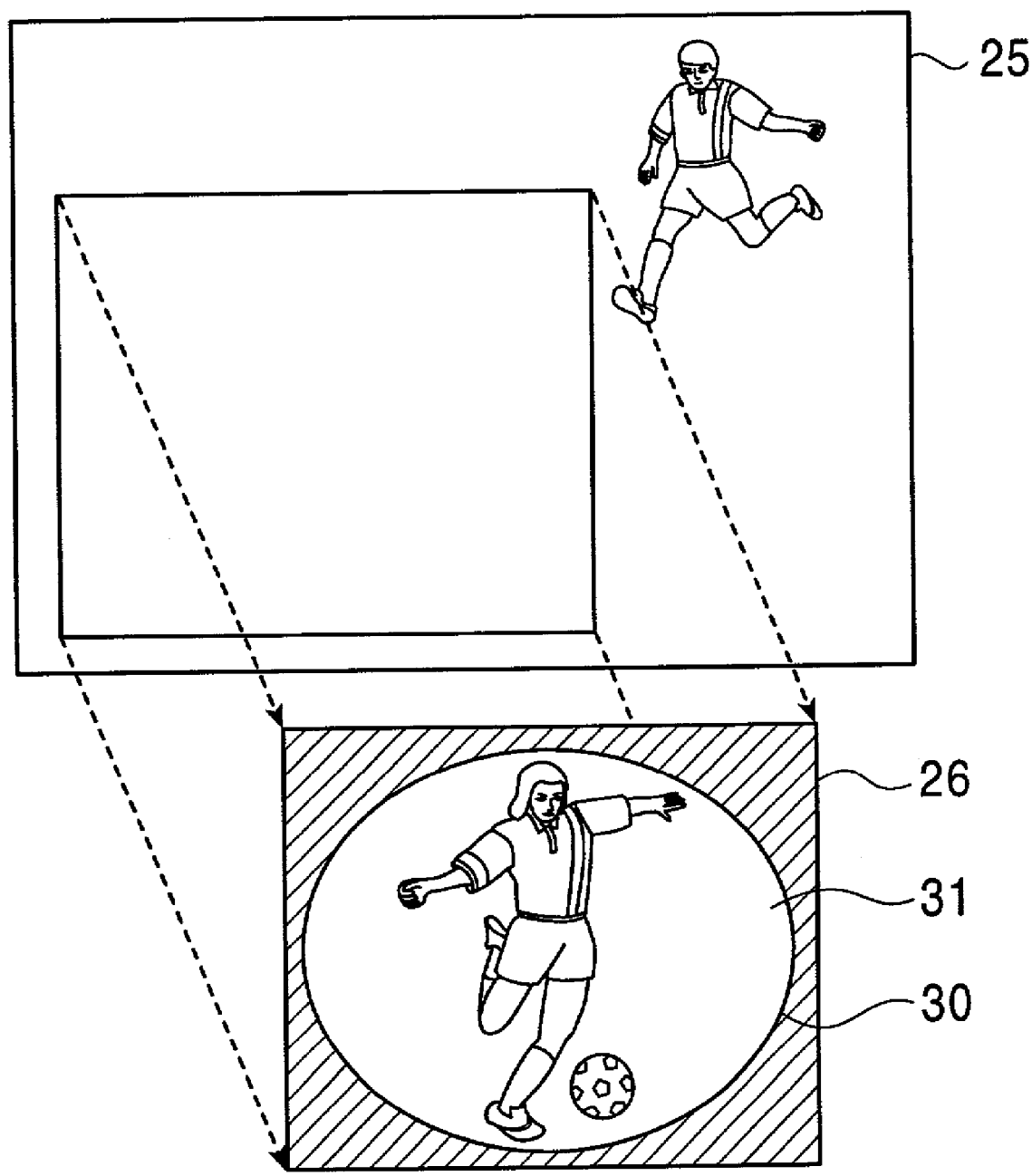
FIG. 6 is an illustration of obtainment of the extracted picture.

The shape-extraction circuit 28 allocates the tracking region 26 from the frame picture 25, as shown in FIG. 6, and obtains an extracted picture 31 by superimposing the frame 30 on the allocated tracking region 26 so that their central positions (not shown) coincide with each other while part of the tracking region 26 inside the frame 30 remains unchanged, and using, for example, black pixels to replace the pixels of the other part of the tracking region 26 outside the frame 30 so that the other part cannot be displayed at the receiving side.

Figure 7:
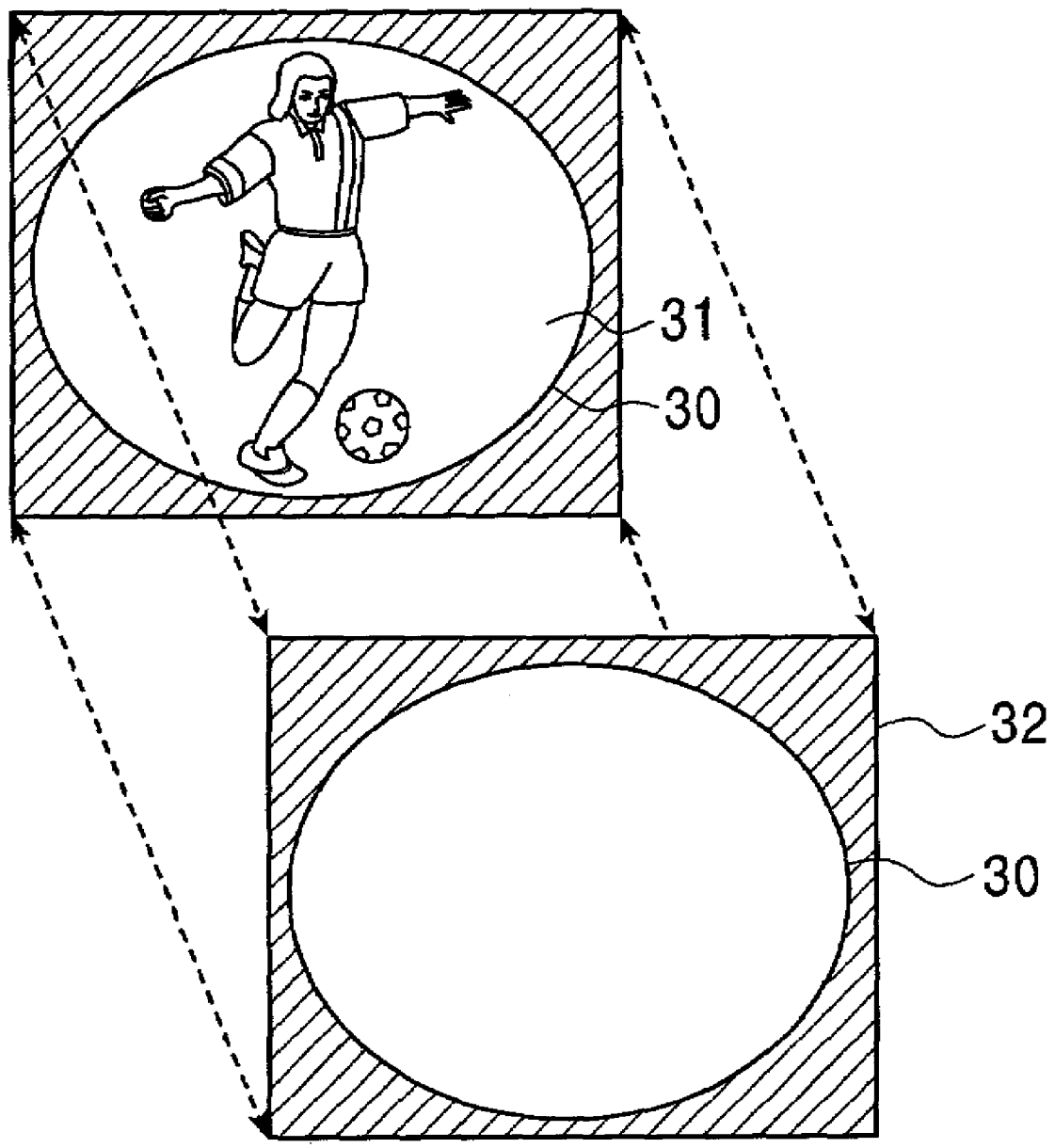
FIG. 7 is an illustration of the structure of a mask picture for designating the shape of the extracted picture.

In addition, as FIG. 7 shows, by exposing the extracted picture 31 to the tracking region 26, and covering the periphery of the extracted picture 31, the shape-extraction circuit 28 generates a mask picture 32 indicating the shape of the extracted picture 31 to the receiving side. As described above, whenever the tracking data D12 is supplied from the motion tracking circuit 22, the shape-extraction circuit 28 obtains the extracted picture 31 by allocating the tracking region 26 tracked by the motion tracking circuit 22 from the frame picture 25, and generates the mask picture 32 indicating the shape of the extracted picture 31. The shape-extraction circuit 28 sends the data (including the periphery replaced by the black pixels of the tracking region 26) of the extracted picture 31 and the data of the mask picture 32, as shape-extraction data D14, to an arbitrary shape encoding unit 35, together with identification information, assigned-picture information, and the motion vector of each macroblock which are obtained based on the tracking data D12.

In addition, after the scene changes, when the motion tracking circuit 22 notifies the shape-extraction circuit 28 of the tracking-stop state, and the tracking data D12 is not supplied, the shape-extraction circuit 28 stops the above consecutive picture-extraction processing and notifies the arbitrary shape encoding unit 35 of the processing stop until the tracking data D12 is supplied again.

After the shape-extraction data D14 is supplied from the shape-extraction circuit 28 to the arbitrary shape encoding unit 35, when assigned-picture information based on the shape-extraction data D14 represents the I-picture type (i.e., when the I-picture type is assigned to extracted-picture data based on the shape-extraction data D14), the arbitrary shape encoding unit 35 performs compression encoding at a relatively low compression factor on the extracted-picture data based on the shape-extraction data D14 by performing intra-frame encoding in units of macroblocks while maintaining the original picture size. Similarly, the arbitrary shape encoding unit 35 performs compression encoding on mask-picture data obtained based on the shape-extraction data D14, and transmits the compression-encoded extracted-picture data and mask-picture data to the external network transmitter.

In addition, when the assigned-picture information based on the shape-extraction data D14 represents the P-picture type (i.e., when the P-picture type is assigned to extracted-picture data based on the shape-extraction data D14), the arbitrary shape encoding unit 35 performs compression encoding at a relatively low compression factor on the extracted-picture data based on the shape-extraction data D14 by performing forward motion-compensation inter-frame prediction using corresponding motion vectors in units of macroblocks while maintaining the original picture size. Similarly, the arbitrary shape encoding unit 35 performs compression encoding on the mask-picture data obtained based on the shape-extraction data D14, and transmits the compression-encoded extracted-picture data and mask-picture data to the external network transmitter.

As described above, the arbitrary shape encoding unit 35 can perform sequential compression encoding on consecutive extracted-picture data for displaying a moving picture having an arbitrary shape, and can perform efficient compression encoding while minimizing an increase in the amount of data by assigning either the I-picture type or P-picture type to the extracted-picture data, similarly to the frame encoding unit 24.

After the shape-extraction circuit 28 notifies the arbitrary shape encoding unit 35 of its operation stop, and the shape-extraction data D14 is not supplied, the arbitrary shape encoding unit 35 stops encoding processing until the shape-extraction data D14 is supplied from the shape-extraction circuit 28 again.

The arbitrary shape encoding unit 35 can detect first shape-extraction data D14 (i.e., the shape-extraction data D14 at the time the extraction processing starts) supplied from the shape-extraction circuit 28 when initiating the encoding processing.

Accordingly, when the P-picture type is assigned as a compression encoding type to the extracted-picture data obtained based on the detected first shape-extraction data D14, the arbitrary shape encoding unit 35 uses intra-frame encoding to perform compression encoding on the extracted-picture data after changing its encoding type from the P-picture type to the I-picture type.

In addition, when the I-picture type is assigned as a compression encoding type to extracted-picture data which is just after the extracted-picture data obtained based on the first shape-extraction data D14, the arbitrary shape encoding unit 35 uses forward motion-compensation interframe prediction to perform compression encoding on the extracted-picture data after changing its encoding type from the I-picture type to the P-picture type.

As described above, the arbitrary shape encoding unit 35 can perform appropriate compression encoding while preventing an increase in the amount of data obtained by performing encoding processing on the extracted-picture data based on the shape-extraction data D14 at the start of the encoding processing.

Next, compression-encoding processes in accordance with the simple-profile-processing path SP and the core-profile-processing path CP in the moving picture encoder 20 are described below with reference to FIG. 8.

Figure 8:
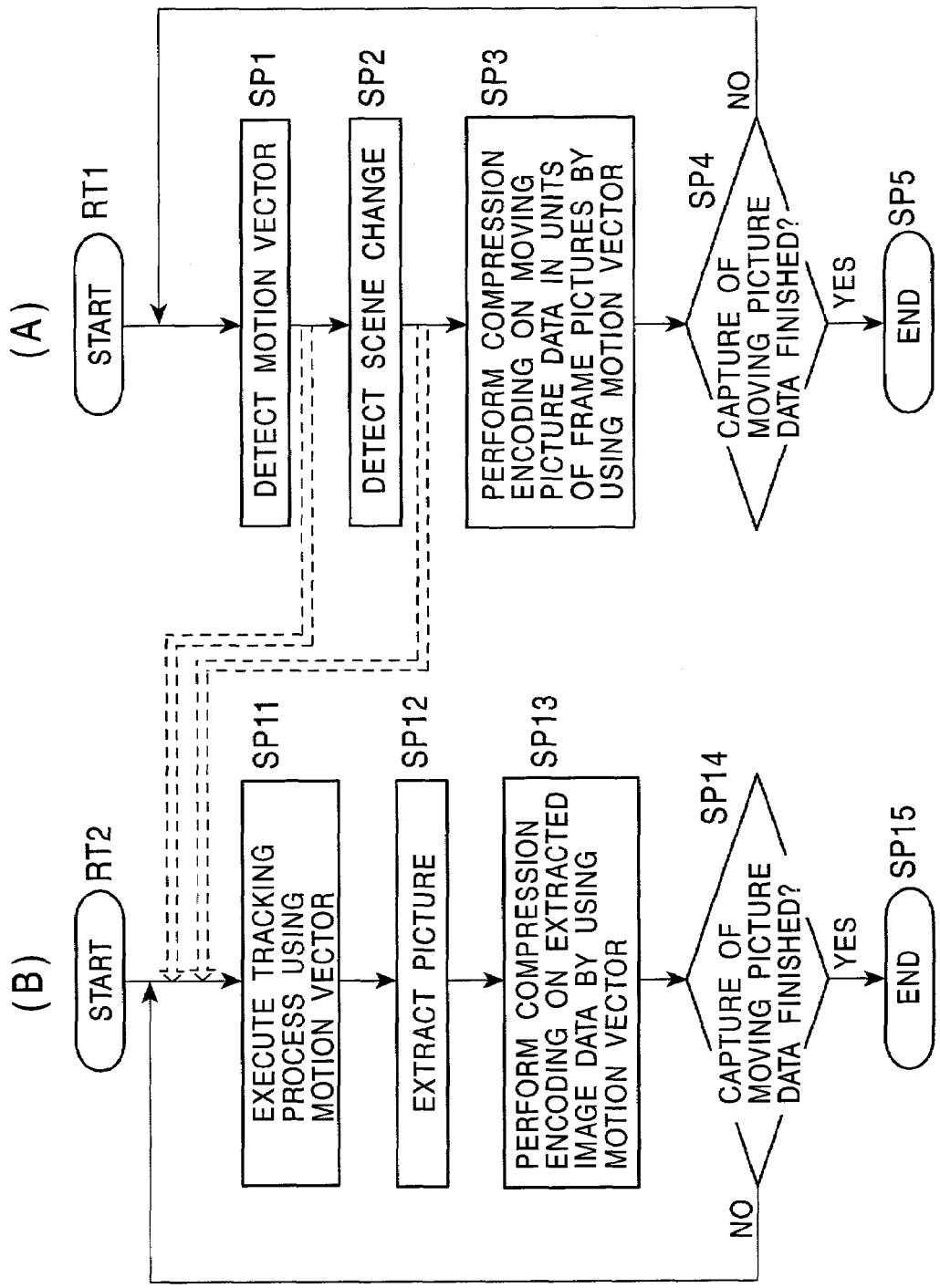
FIG. 8 is a flowchart showing two routines for compression encoding in the moving picture encoder.
Figure 9:
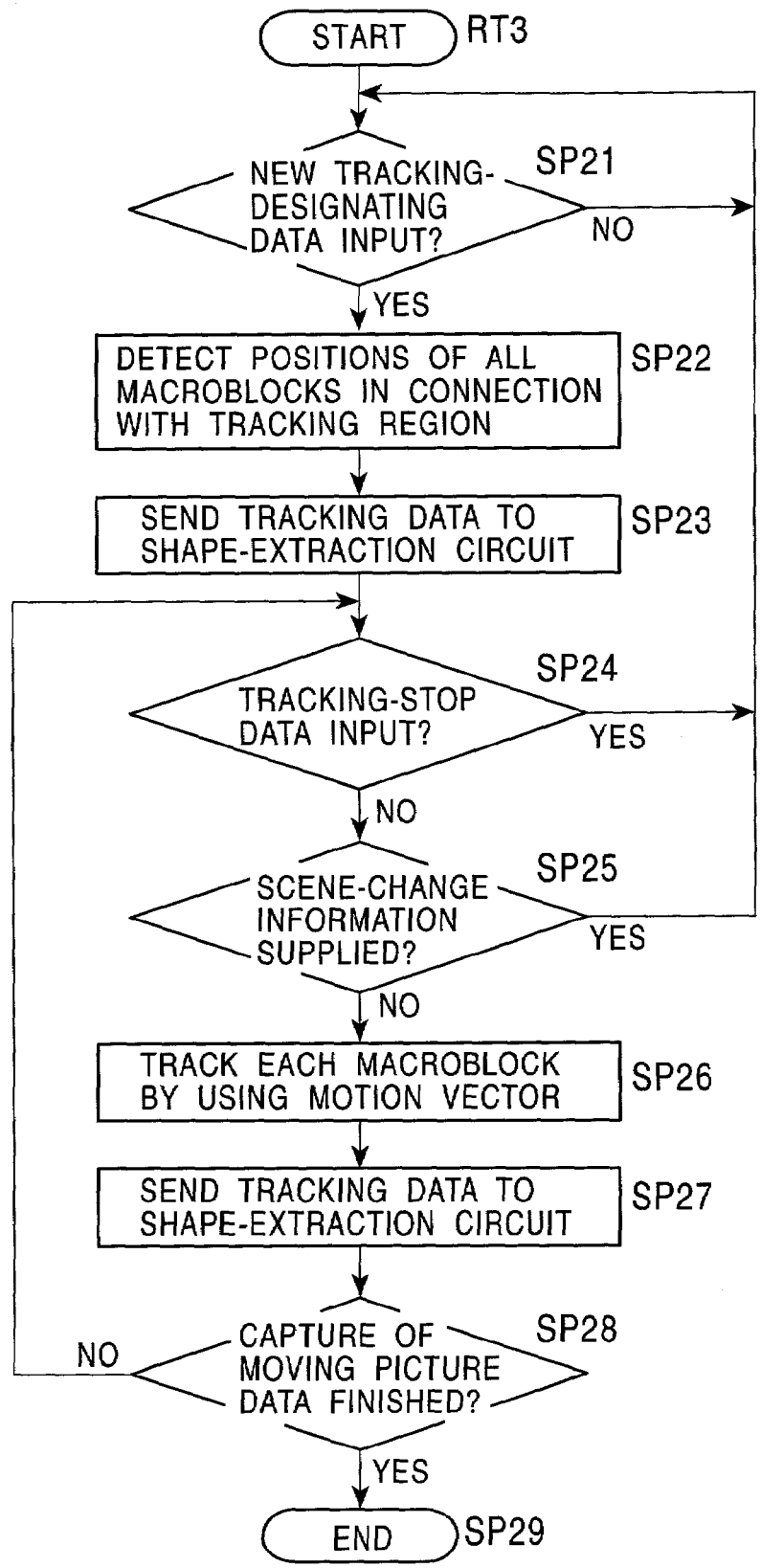
FIG. 9 is a flowchart showing a tracking process.

As portion (A) of FIG. 8 shows, the process of routine RT1 in the simple-profile-processing path SP starts, and proceeds to step SP1.

In step SP1, the motion-vector detection circuit 21 sequentially receives externally supplied moving picture data D1 in the unit of each frame picture 25, and divides the frame picture 25 based on the received frame-picture data into a plurality of macroblocks. The motion-vector detection circuit 21 detects the motion vector for each macroblock between the frame-picture data and frame-picture data which is temporally one frame before the frame-picture data. The motion-vector detection circuit 21 sends, to the motion tracking circuit 22 in the core-profile-processing path CP, vector data D2 which includes the motion vector for each macroblock, and sends, to the scene-change detection circuit 23, frame-picture data which is obtained by dividing the motion vectors for the macroblocks in units of macroblocks. After that, the process proceeds to step SP2.

In step SP2, based on the motion vector for each macroblock in the frame-picture data to be processed which is supplied from the motion-vector detection circuit 21 and on the motion vector for each macroblock which is temporally one frame before the frame-picture data to be processed, the scene-change detection circuit 23 uses correlation between pieces the frame-picture data to determine whether or not the frame-picture data to be processed is one obtained at the time the scene in moving picture has changed. The scene-change detection circuit 23 sends, to the motion tracking circuit 22, scene-change data D3 including the result of the determination, and sends the result of the determination to the frame encoding unit 24, together with the I-frame picture data which is divided in units of macroblocks and the motion vector for each macroblock. After that, the process proceeds to step SP3.

In step SP3, when the I-picture type is assigned as a compression-encoding type to the frame-picture data supplied by the scene-change detection circuit 23, the frame encoding unit 24 uses intra-frame encoding to perform compression encoding on the reduced I-frame picture data in units of reduced macroblocks at a relatively high compression factor, and sends the compression-encoded data to the external network transmitter. When the P-picture type is assigned as a compression-encoding type to the frame-picture data supplied by the scene-change detection circuit 23, the frame encoding unit 24 performs compression encoding on the reduced P-frame picture data in units of reduced macroblocks at a relatively high compression factor by performing forward motion-compensation interframe prediction, and sends the compression-encoded data to the external network transmitter. After that, the process proceeds to step SP4.

In step SP4, in the simple-profile-processing path SP, the process returns to step SP1 if the motion-vector detection circuit 21 has not ended capturing moving picture data D1. After that, until the motion-vector detection circuit 21 ends capturing moving picture data D1, moving picture data D1 is sequentially compression-encoded in units of frames by sequentially repeating the steps in the order of SP4, SP1, SP2, SP3, and SP4. After the motion-vector detection circuit 21 ends capturing moving picture data D1, the process proceeds to step SP5, and ends processing in the simple-profile-processing path SP.

In addition, as the portion (B) of FIG. 8 shows, in the core-profile-processing path CP, the start step of routine RT2 begins, and the process proceeds to step SP11.

In step SP11, the motion tracking circuit 22 sequentially captures the externally supplied moving picture data D1 in units of each frame picture 25, and also captures moving picture data D2 supplied from the motion-vector detection circuit 21 and scene-change data D3 supplied from the scene-change detection circuit 23. The motion tracking circuit 22 uses motion vectors to track and detect the position of each macroblock in the tracking region 26 from the frame picture 25 by executing tracking processing (described later). The motion tracking circuit 22 sends, to the shape-extraction circuit 28, tracking data D12 including information on the detected positions, and proceeds to step SP12.

In step SP12, based on the tracking-designating data D10 supplied from the motion tracking circuit 22, the shape-extraction circuit 28 allocates the tracking region 26 from the frame picture 25, and obtains, from the allocated tracking region 26, the extracted picture 31 in accordance with the shape of the frame 30 designated by the shape-designation data D11. Based on the frame 30, the shape-extraction circuit 28 generates the mask picture 32 indicating the shape of extracted picture 31, and sends, to the arbitrary shape encoding unit 35, the shape-extraction data D14 which includes the data of the mask picture 32. After that, the process proceeds to step SP13.

In step SP13, when the I-picture type is assigned as a compression-encoding type to the extracted-picture data supplied from the shape-extraction circuit 28, the arbitrary I-shape encoding unit 35 performs compression encoding on the extracted-picture data at a relatively low compression factor by performing interframe encoding in units of macroblocks, and also sends, as compression-encoded extracted-picture data D15, to the external network transmitter, both the compression-encoded extracted-picture data and the mask-picture data. When the P-picture type is assigned as a compression-encoding type to the extracted-picture data supplied from the shape-extraction circuit 28, the arbitrary shape encoding unit 35 performs compression encoding on the extracted-picture data at a relatively low compression factor by performing forward motion-compensation interframe prediction in units of macroblocks, and performs compression encoding on the mask-picture data supplied from the shape-extraction circuit 28. The arbitrary shape encoding unit 35 sends both the compression-encoded extracted-picture data and mask-picture data as compression-encoded extracted-picture data D15 to the external network transmitter, and the process proceeds to step SP14.

In step SP14, if the motion tracking circuit 22 in the core-profile-processing path CP has not ended capturing the moving picture data D1, the process returns to step SP11.

After that, until the motion tracking circuit 22 ends capturing the moving picture data D1, while sequentially tracking the extracted-picture data, the extracted-picture data is obtained from the moving picture data D1 and is compression-encoded by repeating the steps in the order of SP14, SP11, SP12, SP13, and SP14. After the motion tracking circuit 22 ends capturing the moving picture data D1, the process proceeds to step SP15 and terminates in the core-profile-processing path CP, so that compression encoding process by the moving picture encoder 20 terminates.

In the core-profile-processing path CP, when the tracking processing performed by the motion tracking circuit 22 is stopped such that the motion tracking circuit 22 is externally instructed to stop, or a scene changes in moving picture, the shape-extraction circuit 28 and the arbitrary shape encoding unit 35 accordingly end their processing, although this step is not shown in the portion (B) of FIG. 8.

The motion tracking circuit 22 (described with reference to FIG. 3 and the portion (B) of FIG. 8) is designed to execute the tracking processing in accordance with a tracking-processing program stored in its internal storage unit beforehand. In accordance with the tracking-processing program, the process of tracking routine RT3 starts and proceeds to step SP21.

In step SP21, the motion tracking circuit 22 waits for new tracking-designating data D10 to be externally input. If the motion tracking circuit 22 has determined that the new tracking-designating data D10 has been input, the motion tracking circuit 22 proceeds to step SP22.

In step SP22, from the frame picture 25 based on the externally captured frame-picture data, the motion tracking circuit 22 detects the positions of all macroblocks in the tracking region 26 designated by the tracking-designating data D10, and proceeds to step SP23.

In step SP23, the motion tracking circuit 22 generates tracking data D12 including the information of the macroblock positions detected in step SP22, and sends the generated tracking data D12 to the shape-extraction circuit 28. After that, the motion tracking circuit 22 proceeds to step SP24.

In step SP24, the motion tracking circuit 22 determines whether or not tracking-stop data D11 has been externally input.

Obtaining negative determination in step SP24 means that the moved position of each macroblock from the frame picture 25 to the tracking region 26 is continuously tracked since the motion tracking circuit 22 is not externally instructed by the tracking-stop data D11 to stop the tracking. At this time, proceeding to step SP25, the motion tracking circuit 22 determines whether or not the scene-change data D3 including the scene-change information has already been supplied from the scene-change detection circuit 23.

Obtaining negative determination in step SP25 means that, since the scene-change data D3 including the scene-change information is supplied, as scene-change data corresponding to the externally supplied frame-picture data to be processed, from the scene-change detection circuit 23, the moved position of each macroblock from the frame picture 25 to the tracking region 26 is continuously tracked in accordance with the tracking-designating data D10. At this time, the motion tracking circuit 22 proceeds to step SP26.

In step SP26, from the frame picture 25 to be processed which corresponds to the identification information in the scene-change data D3, the motion tracking circuit 22 tracks and detects the moved position of each macroblock in the tracking region 26, based on each motion vector (supplied from the motion-vector detection circuit 21) position detected in step SP22, and proceeds to step SP27.

In step SP27, the motion tracking circuit 22 generates and sends, to the shape-extraction circuit 28, the tracking-data D12 including the information (detected in step SP26) of the moved position of each macroblock, and proceeds to step SP28.

In step SP28, the motion tracking circuit 22 determines whether or not capture of the moving picture data D1, sent from the external videocamera, has been completed.

Obtaining negative determination in step SP28 means that the tracking processing is executed in response to an external request since the moving picture data D1, sent from the external videocamera, is sequentially captured in units of frames. At this time, the motion tracking circuit 22 returns to step SP24. After that, until the motion tracking circuit 22 obtains affirmative determination in step SP28, it sequentially tracks and detects the moved position of each macroblock from consecutive frame pictures by sequentially repeating the steps in the order of SP28, SP24, SP25, SP26, SP27, and SP28.

When obtaining affirmatively determines in step SP28 on completion of the moving picture data, as described above, the motion tracking circuit 22 proceeds to step SP29, and the tracking routine RT3 terminates.

Obtaining affirmative determination in step SP24 means that tracking of the moved position of each macroblock in the tracking region 26 is stopped since the tracking-stop data D11 is externally input. At this time, the motion tracking circuit 22 returns to step SP21.

Obtaining affirmative determination in step SP25 means that, since the scene-change data D3 including the scene-change information is supplied, as scene-change data corresponding to the externally supplied frame-picture data to be processed, from the scene-change detection circuit 23, tracking of the moved position of each macroblock in the tracking region 26 is stopped in accordance with the scene-change data D3. At this time, the motion tracking circuit 22 returns to step SP21.

As described above, in response to an external request, the motion tracking circuit 22 can detect the moved position of each macroblock in the tracking region 26 in the frame picture 25 while sequentially performing appropriate tracking.

2-2. Operation and Effects of the Embodiment

In the above construction, the simple-profile-processing path SP for the moving picture data D1, and the core-profile-processing path CP for the moving picture data D1 are provided in the moving picture encoder 20.

In the moving picture encoder 20, the motion-vector detection circuit 21 sequentially captures the moving picture data D1 in units of each frame 25, and detects the motion vector for each macroblock. By controlling the simple-profile-processing path SP and the core-profile-processing path CP to use the detected motion vector for each macroblock in common, the moving picture encoder 20 uses the simple-profile-processing path SP to perform sequential compression encoding on the moving picture data D1 in units of each frame picture 25 and the core-profile-processing path CP to perform compression encoding on the extracted picture 31 after sequentially tracking and obtaining it from the frame picture 25 composed of consecutive moving picture data by using motion vectors.

Therefore, although the moving picture encoder 20 is provided with two processing systems, the simple-profile-processing path SP and the core-profile-processing path CP, it uses a single motion-vector detection circuit 21 on which a greatly large processing load acts in the case of executing compression-encoding processing, and controls the two processing systems to share motion vectors detected by the motion-vector detection circuit 21, whereby the processing load of the entirety of the moving picture encoder 20 can be greatly reduced.

In the moving picture encoder 20, a single motion-vector detection circuit 21 is provided for two processing systems, the simple-profile-processing path SP and the core-profile-processing path CP. Thus, the circuit configuration of the entirety of the moving picture encoder 20 can be simplified.

In addition, the moving picture encoder 20 changes the compression encoding type of frame-picture data from the P-picture type to the I-picture type in accordance with the scene change detected by the scene-change detection circuit 23. Thus, the moving picture encoder 20 can perform appropriate compression encoding on frame-picture data composed of consecutive moving picture data D1. Also, when frame-picture data to which the I-picture type is originally assigned follows just after the frame-picture data in which its compression-encoding type has been changed to the I-picture type by the scene change, the encoding type of the I-picture-originally-assigned frame-picture data is changed to the P-picture type, whereby frame-picture data composed of consecutive moving picture data D1 can be appropriately compression-encoded.

Since the moving picture encoder 20 stops tracking by the motion tracking circuit 22 of the tracking region 26 in the frame picture 25 in accordance with the scene change in moving picture detected by the scene-change detection circuit 23, the tracking region 26 can be appropriately tracked in a single scene of moving picture, so that the extracted picture 31 can be appropriately shown to the user at the receiving side.

In the moving picture encoder 20, a single scene-change detection circuit 23 is provided for two processing systems, the simple-profile-processing path SP and the core-profile-processing path CP, and the scene-change detection circuit 23 controls the simple-profile-processing path SP and the core-profile-processing path CP to share scene-change information on the detected moving picture. Thus, the circuit configuration of the moving picture encoder 20 can be simplified, even if the scene-change detection circuit 23 is provided.

According to the above-described construction, by using both a processing path in which moving picture data D1 is sequentially compression-encoded in units of each frame picture 25 by performing motion-compensation interframe prediction, and the other processing path in which the extracted picture 31 is obtained from the frame picture 25, which the moving picture data D1 continues, by sequentially tracking the extracted picture 31 to share the motion vector for each macroblock detected in units of frame pictures by a single motion-vector detection circuit 21, the processing load to a plurality of pictures obtained from one picture of the entirety compression-encoding processing can be greatly reduced, whereby a moving picture encoder is implemented which can accelerate compression-encoding processing on a plurality of pictures obtained from one picture.

3. Other Embodiments

In the above embodiment, a case has been described in which frame-picture data of consecutive moving picture data D1 is compression-encoded at a relatively high compression factor and extracted-picture data obtained from the moving picture data D1 is compression-encoded at a relatively low compression factor. However, the present invention is not limited to this case, but if the amount of the compression-encoded frame-picture data D6 and D7 and the amount of the compression-encoded extracted-picture data D15 are within the transfer rate at which they can be sent to the receiving side, a process may be performed in which frame-picture data of consecutive moving picture data D1 is compression-encoded at a relatively high compression factor and extracted-picture data obtained from the moving picture data D1 is compression-encoded at a relatively low compression factor.

In the above embodiment, a case has been described in which the I-picture type and the P-picture type are assigned as compression encoding types to frame-picture data by the motion-vector detection circuit 21, which captures moving picture data D1 in units of frames. However, the present invention is not limited to this case. In addition to the I-picture type and the P-picture type, the bidirectionally predicted picture (B-picture) type which uses bidirectional motion-compensation interframe prediction to perform compression encoding may be assigned to frame-picture data composed of consecutive moving picture data D1.

In the above embodiment, a case has been described in which a single simple-profile-processing path SP and a single core-profile-processing path CP are provided to the moving picture encoder 20. However, the present invention is not limited to this case, but may employ various circuit configurations such as an example of the moving picture encoder 20 provided with a single simple-profile-processing path SP and a plurality of core-profile-processing paths CP which perform compression encoding on the moving picture data D1 in units of each different-shaped extracted picture 31 by performing motion-compensation interframe prediction using motion vectors, and an example of the moving picture encoder 20 provided with only a plurality of core-profile-processing paths which perform compression encoding on the moving picture data D1 in units of each different-shaped extracted picture 31 by performing motion-compensation interframe prediction using motion vectors. In the case of providing a plurality of core-profile-processing paths, the extracted-picture data may be compression-encoded at a single compression factor in each of the core-profile-processing paths.

Figure 10:
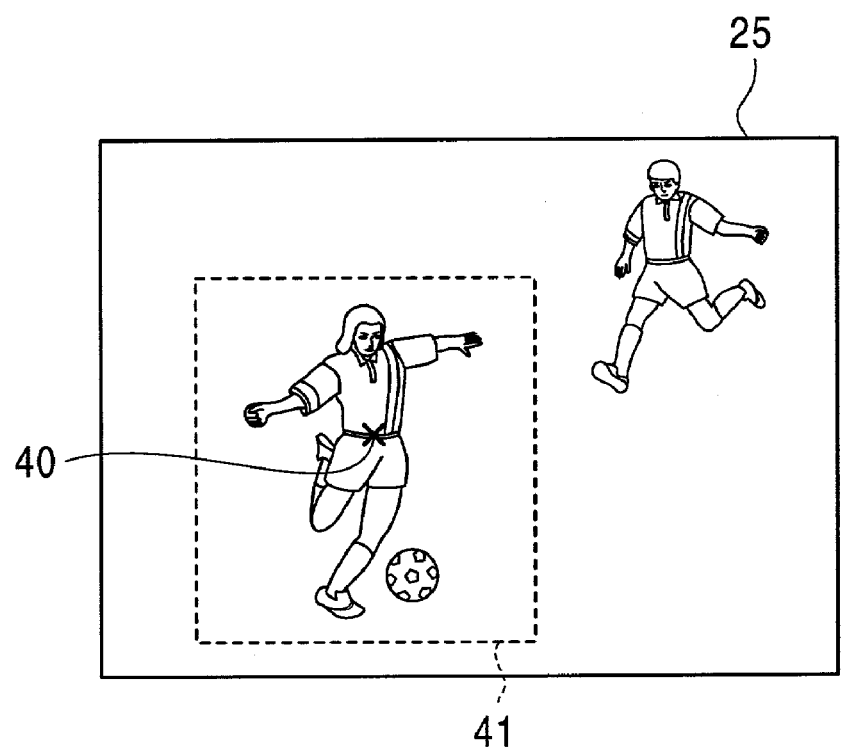
FIG. 10 is an illustration of designation by another embodiment of the tracking region.

In the above embodiment, a case has been described in which a tracking region that is set to be rectangular beforehand is designated for the motion tracking circuit 22. However, the present invention is not limited to this case. As FIG. 10 shows, for the motion tracking circuit 22, by designating an arbitrary point 40, for example, on a person in the frame picture 25, and extracting peripheral edges (i.e., the contours of the person, etc.) around the point 40, a rectangular tracking region 40 having an arbitrary shape may be set so as to include the extracted edges.

In the above embodiment, a case has been described in which the motion tracking circuit 22 tracks and detects the moved position of each macroblock in the tracking region 26 by using the corresponding vector data D2 (i.e., the motion vector for each macroblock) supplied from the motion-vector detection circuit 21, for example, by using line matching. However, the present invention is not limited to this case. The motion tracking circuit 22 may perform detection while using line matching to track the tracking region 26 in units of pixels (i.e., not in units of macroblocks) after performing tracking in units of macroblocks with the vector data D2 supplied from the motion-vector detection circuit 21.

Figure 11:
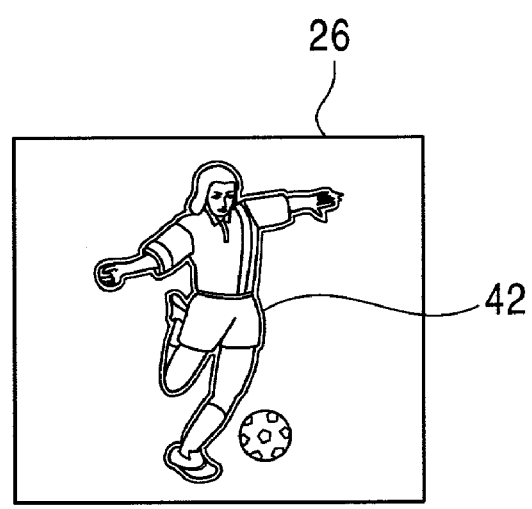
FIG. 11 is an illustration of designation by another embodiment of the shape of the extracted picture.

In the above embodiment, a case has been described in which the frame 30 that is set to be ecliptic beforehand is designated for the shape-extraction circuit 28. However, the present invention is not limited to this case. As FIG. 11 shows, by using the shape-extraction circuit 28, the contour in the tracking region 26 of the person or the like may be automatically set as a frame 42. Alternatively, for the shape-extraction circuit 28, various types of frames having shapes such as a star and a circle other than an ellipse may be designated. Accordingly, arbitrary-shaped frames may be widely used.

In the above embodiment, a case has been described in which when the scene-change detection circuit 23 detects a scene change, the motion tracking circuit 22 accordingly stops the tracking of the tracking region 26. However, the present invention is not limited to this case. Even when a scene of moving picture has changed, the motion tracking circuit 22 may directly track a region obtained by superimposing the tracking region 26 which is obtained just before the scene changes on the frame picture 25 obtained at the time the scene has changed, without changing the size and position of the tracking region just before the scene change. In the case of tracking the tracking region 26 even when the scene has changed, the shape-extraction circuit 28 and the arbitrary shape encoding unit 35 may be accordingly controlled to operate.

In the above embodiment, a case has been described in which the motion-vector detection circuit 21, the scene-change detection circuit 23, and the frame encoding unit 24 are connected in series in the core-profile-processing path CP, while the motion tracking circuit 22, the shape-extraction circuit 28, and the arbitrary shape encoding unit 35 are connected in series in the core-profile-processing path CP. However, the present invention is not limited to this case. By providing a storage unit which captures and temporarily stores moving picture data supplied from the videocamera, the motion-vector detection circuit 21, the scene-change detection circuit 23, the frame encoding unit 24, the motion tracking circuit 22, the shape-extraction circuit 28, and the arbitrary shape encoding unit 35 may be separately connected to the storage unit.

Specifically, in the above-described moving picture encoder 20 shown in FIG. 3, in order that the motion-vector detection circuit 21, the scene-change detection circuit 23, and the frame encoding unit 24 may be connected in series and that the motion tracking circuit 22, the shape-extraction circuit 28, and the arbitrary shape encoding unit 35 may be connected in series, the motion-vector detection circuit 21, the scene-change detection circuit 23, the frame encoding unit 24, the motion tracking circuit 22, the shape-extraction circuit 28, and the arbitrary shape encoding unit 35 must include storage units for absorbing processing delays.

Conversely, by providing the moving picture encoder 20 with a storage unit which captures and temporarily stores moving picture data supplied from the videocamera, and separately connecting, to the storage unit, the motion-vector detection circuit 21, the scene-change detection circuit 23, the frame encoding unit 24, the motion tracking circuit 22, the shape-extraction circuit 28, and the arbitrary shape encoding unit 35, the storage capacity of the storage unit in the moving picture encoder 20 can be greatly reduced, and the processing of the moving picture encoder 20 can be accelerated because each of the motion-vector detection circuit 21, the scene-change detection circuit 23, the frame encoding unit 24, the motion tracking circuit 22, the shape-extraction circuit 28, and frame-picture data to be processed can be read with arbitrary timing from the storage unit by the moving picture encoder 20.

In the above embodiment, a case has been described in which the moving picture encoder 20 described with reference to FIGS. 3 to 11 is used as a moving picture encoder of the present invention. However, the present invention is not limited to this case, but can be widely applied to a type of moving picture encoder which employs the MPEG-2 standard and which performs sequential compression encoding on moving picture data as a predetermined arbitrary-shaped picture in units of frame pictures or in units of extracted pictures obtained from the frame pictures by performing motion-compensation interframe prediction using motion vectors, a type of moving picture encoder which performs compression encoding on moving picture data which is internally or externally stored instead of streaming, similarly to the moving picture encoder 20 described with reference to FIGS. 3 to 11, and even to those which can perform compression encoding on moving picture data, such as personal computers, cellular phones, personal digital assistants (PDAs), and other various types of moving picture encoders.

In the case of applying a moving picture encoder of the present invention to an electronic device such as a personal computer, a cellular phone, and a PDA, the above circuit blocks described with reference to FIG. 3 may be provided as hardware in the electronic device. Alternatively, instead of the hardware, by installing in the electronic device a program for executing the compression encoding processing described with reference to the portions (A) and (B) of FIG. 8, and executing the compression encoding processing in accordance with the program in the form of software processing, the present invention can be also implemented.

In order to install in the electronic device the program for executing the compression encoding processing described with reference to the portions (A) and (B) of FIG. 8, a storage medium storing the program may be used, and a wired or wireless communication medium such as a local area network (LAN), the Internet, or digital satellite broadcasting may be used. Also, the program may be installed by using various types of communication interfaces such as a router and a modem.

Not only package media such as a floppy disk, a compact-disk read-only memory, and a digital versatile disk, but also a storage device (such as a semiconductor memory or a magnetic disk) temporally or eternally storing a distribution processing program may be used as a program storage medium for installing the program in the electronic device. In addition, a wired or wireless communication medium such as a LAN, the Internet, or digital satellite broadcasting may be used as means of storing the distribution processing program in the above program storage medium. Alternatively, the distribution processing program may be installed by using various types of communication interfaces such as a router and a modem.

In the above embodiment, a case has been described in which the motion-vector detection circuit 21 (shown in FIG. 3) which detects each motion vector in units of macroblocks is used as a motion-vector detection means which detects each motion vector between frame pictures of moving picture data. However, the present invention is not limited to this case. Various types of motion-vector detection means, such as a motion-vector detection means which detects a motion vector in units of predetermined blocks which are different from units of macroblocks, and a motion-vector detection means uses an optical flow to detect a motion vector, can be used if they can detect each motion vector between frame pictures of moving picture data.

In the above embodiment, a case has been described in which the above-described frame encoding unit 24 and the arbitrary shape encoding unit 35 (both shown in FIG. 3) are uses as a plurality of compression encoding means which perform compression encoding on the moving picture data in units of predetermined pictures having different arbitrary shapes by performing motion-compensation interframe prediction using the detected motion vector in a shared form. However, the present invention is not limited to this case. Various types of compression encoding means, such as a plurality of compression encoding means, etc., which perform compression encoding on moving picture data only in units of extracted pictures having different arbitrary shapes, can be used if they can perform compression encoding on the moving picture data in units of predetermined pictures having different arbitrary shapes by performing motion-compensation interframe prediction using the detected motion vector in a shared form.

In the above embodiment, a case has been described in which the above-described motion tracking circuit 22 (described with reference to FIGS. 3 and 9) is used as a tracking means which sequentially tracks a predetermined tracking region in each of the frame pictures consecutively having the moving picture data by using the detected motion vector in the shared form. However, the present invention is not limited to this case. Various types of tracking means, such as a tracking means which automatically set a tracking region in accordance with the motion of a portion of a moving picture, can be used if they can sequentially track a predetermined tracking region in each of the frame pictures consecutively having the moving picture data by using the detected motion vector in a shared form.

In the above embodiment, a case has been described in which the above shape-extraction circuit 28 (described with reference to FIGS. 5 to 7) is used as an extraction means which extracts an arbitrary-shaped picture from the tracked predetermined tracking region in each of the frame pictures. However, the present invention is not limited to this case. Various types of extraction means, such as an extraction means which automatically extracts a picture as an extracted picture in the tracking region along the contour of the picture, can be used if they can extract an arbitrary-shaped picture from the tracked predetermined tracking region in each of the frame pictures.

In the above embodiment, a case has been described in which the above scene-change detection circuit 23 (shown in FIG. 3) which detects a scene change in moving picture by calculating correlation based on motion vectors between frame pictures is used as a scene-change detection means which detects correlation between the frame pictures and determines, based on the detected correlation, whether or not a scene in moving picture has changed. However, the present invention is not limited to this case. Various types of scene-change detection means, such as a scene-change detection means which detects a scene change by calculating correlation between frame pictures which is based on various pieces of information such as brightness and illuminance, can be used if they can detect correlation between the frame pictures and determines, based on the detected correlation, whether or not a scene in moving picture has changed.

What is claimed is:

1. A moving picture encoder comprising:
motion-vector detection means which detects a motion vector between frame pictures of moving picture data;
tracking means for sequentially tracking a predetermined tracking region in each of said frame pictures consecutively having the moving picture data by using the detected motion vector in the shared form;
extraction means for extracting an arbitrarily-shaped picture from the tracked predetermined tracking region in each of said frame pictures; and
a plurality of encoding means for performing encoding on the moving picture data in units of predetermined pictures by performing motion-compensation interframe prediction using the detected motion vector in common and the result of said extraction means;
wherein said plurality of encoding means includes an arbitrary encoding means for performing encoding on the moving picture data in units of the frame pictures as said units of predetermined pictures having different arbitrary shapes.

2. A moving picture encoder according to claim 1,
wherein one of said plurality of encoding means which is different from said arbitrary encoding means performs encoding on the moving picture data in units of each arbitrarily-shaped picture as said units of predetermined pictures having different arbitrary shapes.

3. A moving picture encoder according to claim 2, further comprising:
scene-change detection means for detecting correlation between the frame pictures, said scene-change detection means determining, based on the detected correlation, whether or not a scene in moving picture has changed,
wherein said tracking means stops the tracking of the predetermined tracking region for frame pictures subsequent to the frame picture at the time said scene-change detection means has determined that the scene has changed.

4. A moving picture encoding method comprising:
a motion-vector detection step for detecting a motion vector between frame pictures of moving picture data;
a tracking step for sequentially tracking a predetermined tracking region in each of said frame pictures consecutively having the moving picture data by using the detected motion vector in the shared form;
an extraction step for extracting an arbitrarily-shaped picture from the tracked predetermined tracking region in each of said frame pictures;
an encoding step for performing encoding on the moving picture data in units of predetermined pictures by performing motion-compensation interframe prediction using the detected motion vector in common and the result of said extraction step;
wherein, in said encoding step, the encoding on the moving picture data is performed in units of the frame pictures as said units of predetermined pictures having different arbitrary shapes.

5. A moving picture encoding method according to claim 4,
wherein the encoding on the moving picture data is performed in units of each arbitrarily-shaped picture as said units of predetermined pictures having different arbitrary shapes.

6. A moving picture encoding method according to claim 5, further comprising:
a scene-change detection step for detecting correlation between the frame pictures, said scene-change detection step determining, based on the detected correlation, whether or not a scene in moving picture has changed, wherein, in said tracking step, the tracking of the predetermined tracking region is stopped for frame pictures subsequent to the frame picture at the time said scene-change detection step has determined that the scene has changed.

7. A storage medium storing a moving picture encoding program for controlling a moving picture encoder to execute a process comprising:
- a motion-vector detection step for detecting a motion vector between frame pictures of moving picture data;
- a tracking step for sequentially tracking a predetermined tracking region in each of said frame pictures consecutively having the moving picture data by using the detected motion vector in the shared form;
- an extraction step for extracting an arbitrarily-shaped picture from the tracked predetermined tracking region in each of said frame pictures; and
- an encoding step for performing encoding on the moving picture data in units of predetermined pictures by performing motion-compensation interframe prediction using the detected motion vector in common and the result of said extraction step;

wherein, in said encoding step, the encoding on the moving picture data is performed in units of the frame pictures as said units of predetermined pictures having different arbitrary shapes.

8. A moving picture encoding program for controlling a moving picture encoder to execute a process comprising:
- a motion-vector detection step for detecting each motion vector between frame pictures of moving picture data;
- a tracking step for sequentially tracking a predetermined tracking region in each of said frame pictures consecutively having the moving picture data by using the detected motion vector in the shared form;
- an extraction step for extracting an arbitrarily-shaped picture from the tracked predetermined tracking region in each of said frame pictures; and
- an encoding step for performing encoding on the moving picture data in units of predetermined pictures by performing motion-compensation interframe prediction using the detected motion vector in common and the result of said extraction step;

wherein, in said encoding step, the encoding on the moving picture data is performed in units of the frame pictures as said units of predetermined pictures having different arbitrary shapes.

9. A moving picture encoder comprising:
- motion-vector detection means which detects a motion vector between frame pictures of moving picture data;
- tracking means for sequentially tracking a predetermined tracking region in each of said frame pictures consecutively having the moving picture data by using the detected motion vector in the shared form;
- extraction means for extracting an arbitrarily-shaped picture from the tracked predetermined tracking region in each of said frame pictures; and
- a plurality of encoding means for performing encoding on the moving picture data in units of predetermined pictures by performing motion-compensation interframe prediction using the detected motion vector in common and the result of said extraction means, wherein said plurality of encoding means including an arbitrary encoding means for performing encoding on the moving picture data in units of the frame pictures as said units of predetermined pictures having different arbitrary shapes, and wherein one of said plurality of encoding means which is different from said arbitrary encoding means performs encoding on the moving picture data in units of each arbitrarily-shaped picture as said units of predetermined pictures having different arbitrary shapes.

10. A moving picture encoding method comprising: a motion-vector detection step for detecting a motion vector between frame pictures of moving picture data;
- a tracking step for sequentially tracking a predetermined tracking region in said frame pictures consecutively having the moving picture data by using the detected motion vector in the shared form;
- an extraction step for extracting an arbitrarily-shaped picture from the tracked predetermined tracking region in each of said frame pictures; and
- an encoding step for performing encoding on the moving picture data in units of predetermined pictures by performing motion-compensation interframe prediction using the detected motion vector in common and the result of said extraction step, wherein, in said encoding step, the encoding on the moving picture data is performed in units of the frame pictures as said units of predetermined pictures having different arbitrary shapes, and wherein the encoding on the moving picture data is performed in units of each arbitrarily-shaped picture as said units of predetermined pictures having different arbitrary shapes.

* * * * *